June 22, 1948. L. A. WILLIAMS, JR 2,443,940
HEATING SYSTEM
Filed April 10, 1943 2 Sheets-Sheet 2
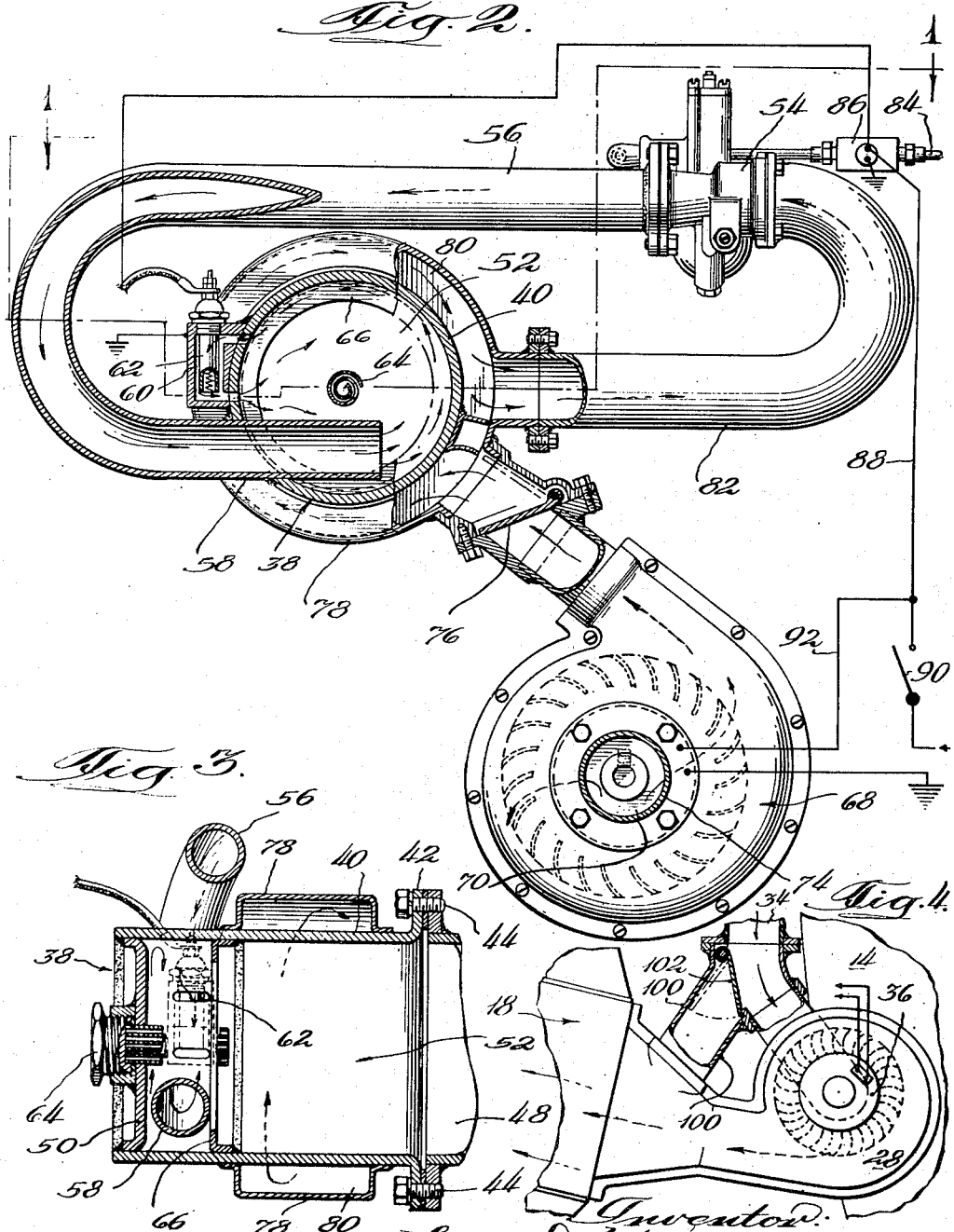

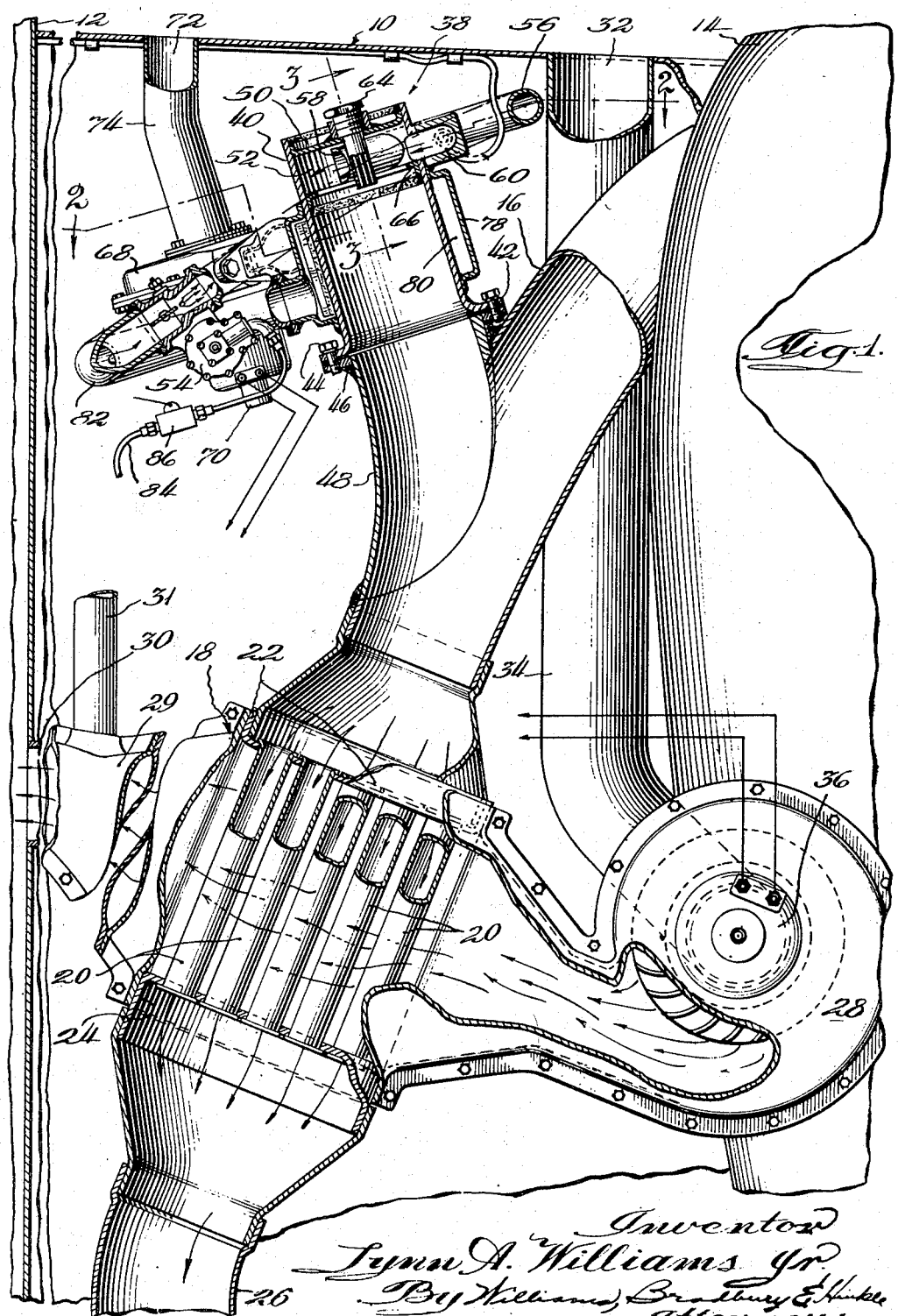

Patented June 22, 1948

2,443,940

UNITED STATES PATENT OFFICE 2,443,940

HEATING SYSTEM

Lynn A. Williams, Jr., Northfield, Ill., assignor to Stewart-Warner Corporation, Chicago, Ill., a corporation of Virginia Application April 10, 1943, Serial No. 482,529

5 Claims. (Cl. 237—12.3)

1

My invention relates to heating systems and is more particularly concerned with a heating system for use on airplanes and for other similar purposes.

In modern aircraft, it is common to use the heat of the engine exhaust to heat the cabin or other passenger space or spaces of airplanes. When the airplane is on the ground loading or unloading passengers, or for other similar purposes, it is usual to stop the airplane motors and during such periods no heat is supplied to the passenger space of the airplane.

It is also common in aircraft practice to use the engine exhaust to heat the leading edges of the airplane wings to prevent the formation of ice thereon. In case of failure of the engine supplying the exhaust for heating the wings or where this engine is idling, inadequate heat will be available for such wing de-icing.

An object of my invention is to provide a new and improved heating system for airplanes which will supply heat while the engine is not operating or is operating in such manner as to supply inadequate exhaust heat.

Another object of my invention is to provide a new and improved heating system wherein a burner is used to furnish the required heat whenever insufficient heat is supplied by the engine exhaust.

Another object of my invention is to provide a new and improved heating system which is light in weight, simple, rugged and efficient and which may be easily applied to existing airplanes.

Another object of my invention is to provide a new and improved heating system wherein the same heat exchanger is used for obtaining heat from either the engine exhaust or from the hot products of combustion from a burner.

Another object of my invention is to provide a new and improved heating system for airplanes which will supply adequate quantities of heat under all conditions.

Another object of my invention is to provide a new and improved burner.

Other objects and advantages will become apparent as the description proceeds.

In the drawings:

Fig. 1 is an irregular, horizontal, sectional view through a wing of an airplane incorporating a preferred embodiment of my invention and is taken on the line 1—1 of Fig. 2;

Fig. 2 is an irregular, vertical, sectional view taken on the line 2—2 of Fig. 1;

Fig. 3 is a longitudinal, sectional view showing

2 the burner and is taken on the line 3—3 of Fig. 1; and

Fig. 4 is a view showing a modification.

Fig. 1 of the drawings is a somewhat diagrammatic, sectional view through an airplane wing and shows a wing 10 attached to a cabin wall 12 and mounting an engine nacelle 14. An engine exhaust pipe 16 projects from the side of the engine nacelle 14 and into the wing 10. This exhaust pipe conducts the engine exhaust to a heat exchanger 18, comprising a plurality of spaced exhaust conducting tubes 20 mounted in headers 22 and 24. A tail pipe 26 is attached to the heat exchanger 18 and conducts the exhaust gases to atmosphere.

A ventilating air blower 28 supplies ventilating air to the heat exchanger 18 wherein this ventilating air flows between the tubes 20 and absorbs heat therefrom. The heated ventilating air is indicated as being conducted from the heat exchanger 18 by a tubular structure 29 which discharges this heated air into the interior of the cabin 12 through an opening 30 in the wall of this cabin. It is to be understood that the showing of this drawing is simplified for purposes of illustration and that in most instances the heated air leaving the heat exchanger 18 will pass through a duct system which will discharge the heated air into the cabin at a plurality of outlets instead of through the single outlet shown. A part or all of the heated air may be used to prevent icing of the airplane wings and for this purpose I have illustrated a duct 31 as leading to any suitable de-icing arrangement (not shown). It is to be understood that the heated air may be used for several different purposes and that the particular duct arrangement for distributing this heated air will vary with different installations.

The blower 28 is illustrated as being of the centrifugal type and as receiving its supply of air from a ram 32 which is connected to the blower 28 by a pipe 34. The ram 32, being located at the forward edge of the wing 10, forces air into the blower when the plane is in motion and affords a convenient and efficient means for supplying air to this blower, although any other suitable source of air supply may be provided. The blower 28 may be driven by any suitable means, such as the electric motor 36.

When the airplane engine is operating, the exhaust gases therefrom will normally provide sufficient heat to heat the ventilating air which the blower 28 forces over the tubes 20 of the heat exchanger 18 and into the de-icing arrangement and the airplane cabin or other space or spaces to be heated. When the airplane is descending in a glide from a high altitude and the airplane engine is idling, the demand for heat may be more than can be supplied by the engine exhaust and under these conditions the burner, designated generally by reference character 38, may be utilized to supply the requisite additional heat. This burner also supplies all of the heat necessary when the aircraft engine fails or is stopped for any reason.

The burner 38 comprises a cylindrical body 40 having a flange 42 secured by bolts 44, or any other suitable means, to the flange 46 of a branch 48 of the exhaust pipe 16. A wall 50 closes one end of the body 40 to form a combustion chamber 52 in which a mixture of fuel and air is burned. The resulting hot products of combustion flow lengthwise of the body 40, into the exhaust pipe 16 and pass through the tubes 20 of the heat exchanger 18 to give up heat to the ventilating air furnished by the blower 28. A feature of my invention lies in the fact that the same heat exchanger which serves to transfer heat from the engine exhaust gases to the ventilating air is utilized to supply heat to this air from the hot products of combustion created in the burner.

A carburetor 54 of any suitable or conventional type furnishes a mixture of fuel and air to the combustion chamber 52 by way of an induction tube 56. This induction tube is preferably of sufficient length to insure a thorough mixing of the fuel and air before delivery to the combustion chamber 52 and the outlet end 58 of this tube is preferably made straight and discharges into the combustion chamber 52 in a direction at right angles to the axis of this chamber. Part of the mixture delivered by the induction tube flows along the circular wall of the combustion chamber and into a pocket 60, as indicated by the arrows in Fig. 2. An electrical igniter 62 is located in this pocket and serves to ignite the mixture of fuel and air entering this pocket. The burning mixture passes from the lower end of this pocket into the combustion chamber and ignites all of the combustible mixture therein. The tangential delivery of the induction tube 56 creates a whirling ring of flame in the combustion chamber which facilitates complete combustion of the fuel in this chamber.

The electric igniter 62 is preferably controlled by the usual thermostatic switch which disconnects this igniter from its source of current after the heater attains normal operating temperature. A re-igniter 64 is provided to maintain combustion after the igniter 62 has been disconnected from its source of current. A ring 66 is located in the combustion chamber and serves to direct into the igniter pocket 60 any liquid fuel which may be delivered to the combustion chamber by the induction tube when the heater is first started.

A second blower 68 furnishes air to the carburetor 54. This second blower is driven by an electric motor 70 and receives its supply of air from a ram 72 connected to the blower by a pipe 74. The blower 68 discharges air through a check valve 76 into a housing 78 which surrounds the body 40 and cooperates therewith to provide a passage 80 for the carburetor air. This passage 80 forms almost a complete circle and air discharged by the blower 68 and entering one end of this passage is preheated to an appreciable extent before leaving the other end of this passage and entering the pipe 82 leading to the carburetor 54. Such preheating of the carburetor air prevents formation of ice in this carburetor and facilitates complete vaporization of the fuel supplied by this carburetor.

The carburetor 54 is supplied with fuel through a pipe 84 connected to any suitable source of fuel. A solenoid valve 86 is located in the pipe 84 and serves to disconnect the carburetor from its source of fuel, except when the burner 38 is in operation. In the drawings, this valve is controlled by an electrical circuit 88 containing a switch 90 which also controls the circuit 92 of the motor 70, which operates the blower 68, although separate switches for these circuits may be provided if desired.

When the burner is not operating, the check valve 76 prevents engine exhaust from entering the blower 68. When it is desired to operate the burner, switch 90 is closed to energize blower motor 70 and to open solenoid valve 86 in the fuel line to the carburetor 54. Blower 68 forces air through carburetor 54 to produce a combustible mixture of fuel and air therein and this mixture is delivered to the combustion chamber 52 through induction tube 56. Igniter 62, which may also be controlled by switch 90, ignites this mixture and the resulting hot products of combustion are discharged from the burner 38 into the heat exchanger 18 and heat the ventilating air forced thereover by the blower 28.

After the burner 38 has been operating for an appreciable length of time, the igniter 62 is disconnected from its source of current by the usual thermostatic switch and thereafter combustion is maintained by re-igniter 64 and also by the combustion maintaining proclivities of the ring-like flame in the combustion chamber. The rise in temperature of the walls of the combustion chamber results in the transmission of heat to air flowing in the passage 80 surrounding the combustion chamber and preheats the air delivered to the carburetor 54 to prevent the formation of ice therein and to facilitate vaporization of the fuel supplied by this carburetor.

As soon as the airplane engine is re-started or is again operated in a manner to supply adequate heat from the engine exhaust, the switch 90 may be opened to stop operation of the burner 38. Opening of the switch 90 stops blower 68 and also results in closing of the solenoid valve 86 to cut off the supply of fuel to the carburetor 54. As soon as blower 68 stops, check valve 76 closes and prevents exhaust gases from flowing through the heater, induction tube 56, carburetor 54, pipe 82 and passage 80 into the blower 68. This not only protects the blower but also prevents the carburetor, induction tube 56, pipe 82 and passage 80 from becoming fouled or clogged by carbon from the engine exhaust.

When the plane is operating at normal speeds, the blower 28 is unnecessary, since the ram 32 will supply air under sufficient pressure to create the desired flow through the heat exchanger 18 and the hot air distributing ducts connected therewith. Under these conditions, it is desirable to stop the blower 28 and utilize ram pressure for creating the desired circulation of the ventilating air. When the blower 28 is stopped, the rotor of the blower offers some slight resistance to air flow therethrough and while under most conditions this resistance is not objectionable, it is preferable to provide a bypass around the blower 28 when it is desired to utilize ram pressure for creating the desired circulation of the ventilating air.

Such an arrangement is shown in Fig. 4 wherein a bypass 100 connects the ram pipe 34 directly with the inlet of the heat exchanger 18. This bypass 100 is provided with a light check valve 102 which closes when the blower 28 is operating. When the blower 28 is not operating and the airplane is traveling at normal speeds, the pressure created by the ram 32 forces the check valve 102 to the dotted line position shown in Fig. 4 against the resistance of a light torsion spring or any other suitable means for urging the check valve towards closed position.

While I have illustrated and described in detail only one embodiment of my invention, it is to be understood that my invention is not limited to the particular details shown and described, but may assume numerous other forms and that the scope of my invention is defined in the following claims.

I claim:

1. A heating system for an airplane having an engine which discharges hot exhaust gases, said heating system comprising a heat exchanger having a passage for said exhaust gases and another passage for heating air, means for supplying exhaust gases from said engine to the exhaust passage of said heat exchanger, a burner for supplying hot products of combustion to the exhaust passage of said heat exchanger, a carburetor for said burner, a blower for forcing air through said carburetor and into said burner, means for stopping said blower and shutting off said burner independently of the operation of the engine, and a check valve interposed between said blower and carburetor to prevent flow thereinto of engine exhaust gases when the burner is not operating.

2. A heating system for an airplane having an engine discharging hot exhaust gases, said heating system comprising heat exchange means, means for circulating air through said heat exchange means, means for supplying engine exhaust gases to said heat exchanger means, a burner for supplying hot products of combustion to said heat exchange means, said heat exchange means having a common passage for said engine exhaust and said hot products of combustion, means for supplying fuel to said burner, an air supply conduit leading to said burner, means to shut off said fuel supply at will, and a check valve in said air supply conduit which closes when the burner is not operating and thus prevents the flow of engine exhaust gases through said burner.

3. A heating system for an airplane having an engine discharging hot exhaust gases, said heating system comprising a single heat exchanger, a blower for forcing air through said heat exchanger and into a space to be heated, an electric motor for driving said blower, a ram for supplying air to said blower, a pipe for supplying hot gases to said heat exchanger, said pipe having one branch connected to the engine exhaust, a burner for supplying hot gases to said heat exchanger, said pipe having a second branch connected to said burner, a carburetor for said burner, a blower for supplying air to said carburetor, preheating means for said air interposed between said blower and carburetor, a check valve between said blower and said preheating means, a separate ram for supplying said last-named blower, and a separate motor for driving said last-named blower.

4. A heating system for an airplane having an internal combustion engine, said heating system comprising a heat exchanger, a blower connected to the heat exchanger to force air to be heated through said heat exchanger, a ram connected to supply such air to the blower, means for starting and stopping said blower, a by-pass conduit connecting said ram directly to the heat exchanger for supplying air thereto when the blower is not running, and a normally closed check valve between the said ram and the by-pass adapted to open in the direction of the air flow from the ram to the heat exchanger.

5. A heating system for an airplane having an engine discharging hot gases, said heating system comprising a single heat exchanger, means for forcing air through said heat exchanger and into a space to be heated, a pipe for supplying hot gases to said heat exchanger, said pipe having one branch connected to the engine exhaust, a burner for supplying hot gases to said heat exchanger, said pipe having a second branch connected to said burner, a carburetor for said burner, means for supplying air to said carburetor, preheating means for said air interposed between said air supplying means and the carburetor, means for shutting off said burner independently of the operation of the engine, and a valve between said air supplying means and the preheating means adapted to be closed when the burner is shut off.

LYNN A. WILLIAMS, JR.

REFERENCES CITED

The following references are of record in the file of this patent:

UNITED STATES PATENTS

| Number | Name | Date |
|---|---|---|
| 1,023,422 | D'espujols | Apr. 16, 1912 |
| 1,092,212 | Hauck | Apr. 7, 1914 |
| 1,267,760 | Good | May 28, 1918 |
| 1,648,573 | Brown et al. | Nov. 8, 1927 |
| 1,824,820 | Hynes | Sept. 29, 1931 |
| 1,830,658 | Hynes | Nov. 3, 1931 |
| 1,839,880 | Hyatt | Jan. 5, 1932 |
| 1,924,209 | Kilgour | Aug. 29, 1933 |
| 2,155,278 | Mautsch | Apr. 18, 1939 |
| 2,281,107 | McCollum | Apr. 28, 1942 |
| 2,286,853 | Holthouse | June 16, 1942 |
| 2,308,887 | McCollum | Jan. 19, 1943 |

FOREIGN PATENTS

| Number | Country | Date |
|---|---|---|
| 805,913 | France | Sept. 7, 1936 |